(No Model.) 2 Sheets—Sheet 2.
H. V. HARTZ.
TACKLE BLOCK.
No. 538,584. Patented Apr. 30, 1895.
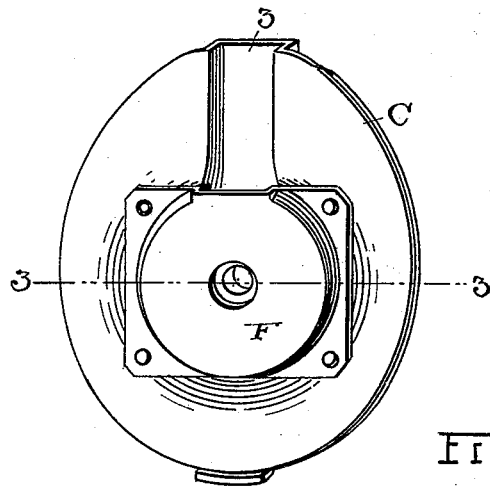
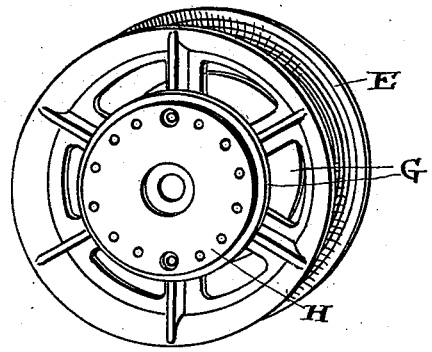
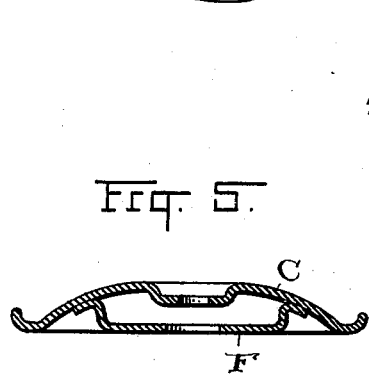
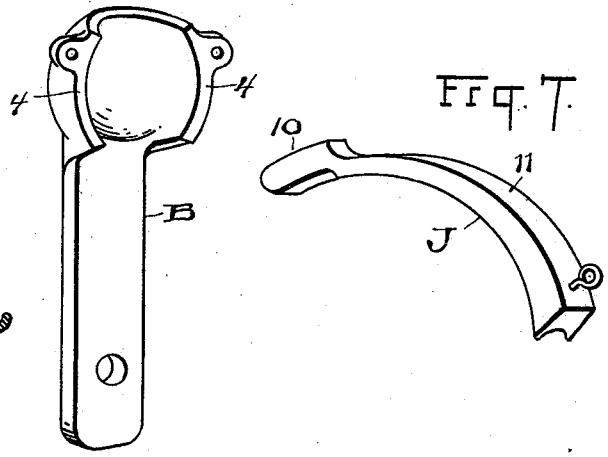
ATTEST
Q. B. Moser.
G. S. Scharffer
INVENTOR,
Henry V. Hartz
By H. J. Fisher ATTORNEY.

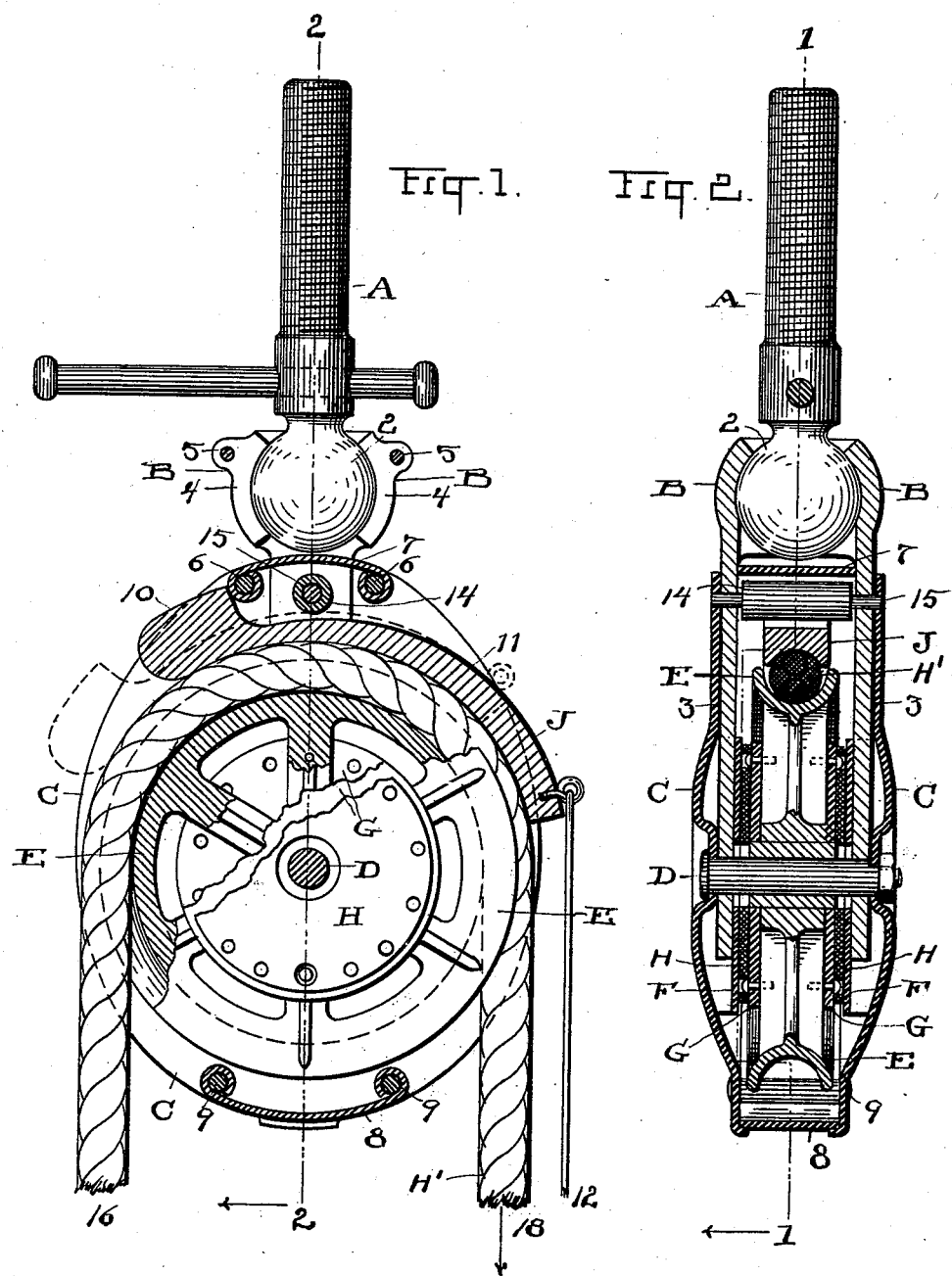

UNITED STATES PATENT OFFICE.

HENRY V. HARTZ, OF CLEVELAND, OHIO.

TACKLE-BLOCK.

SPECIFICATION forming part of Letters Patent No. 538,584, dated April 30, 1895.

Application filed July 28, 1894. Serial No. 518,838. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Tackle or Hoist Blocks; and I do hereby declare that the following is a full, clear, and exact description of the invention, which will enable others skilled in the art to which it appertains to make and use the same.

My invention relates to improvements in tackle or hoist blocks, and the invention consists in the construction of a tackle or hoist block having a ball socket or joint between the attaching screw and the block proper and other novel features of construction, all substantially as shown and described and particularly pointed out in the claims.

In the accompanying drawings, Figure 1 is a side elevation of my improved block, partly in section, on line 1 1, Fig. 2; and Fig. 2 is a vertical central sectional elevation on line 2 2, Fig. 1. Fig. 3 is an inside view, partly in perspective, of one of the cheek-pieces and the bridge-plate across its center. Fig. 4 is a perspective view of the sheave. Fig. 5 is a cross-section on line 3 3, Fig. 3. Fig. 6 is a perspective view of one of the straps, and Fig. 7 is a perspective view of the brake shoe or lock for the rope and sheave.

Having reference now to Figs. 1 and 2, A represents a ball block or bolt screw adapted to be screwed into position as usual, and having a ball-shaped head —2—.

B represents the straps of the block which have one end formed with a concavity, as seen more clearly in Fig. 6, and constituting together the socket for the ball —2— of the supporting screw, so that when the parts are united we have a ball and socket connection between the screw A and the block.

C and C are the cheek pieces, which are fashioned to receive the straps B on their inside, said straps resting in a depression —3— seen in Fig. 3 at the upper part of the cheek piece flush with its inside. These straps extend down and have the shaft D projecting through their lower ends so that as a matter of fact the entire weight or pull on the block is suspended thereon through the said shaft and the sheave E. The socketed ends of the straps B have flat meeting surfaces upon their edges —4— so as to lie flatly upon each other at the edge, and small bolts or rivets —5— pass through holes at their sides and lock said parts firmly together at the socket; but the said straps are further tied together, so as to make the socket absolutely secure laterally, by means of bolts or rivets —6— which connect the cheek pieces at the sides of the straps and pass through the extremities of the spacing plate or piece —7— and are riveted or bolted against the said cheek pieces so as to make the connection firm and rigid. A similar spacing plate or piece —8— with bolts or rivets —9— connects the cheek pieces at the bottom of the block. The outward swell of the cheek pieces at their center is about equal to the thickness of the straps B, and a steel bridge plate F, seen in Figs. 3 and 5 most clearly, bridges across said straps opposite the sheave and has a perfectly flat inner surface which comes flush with the inside of the cheek pieces apart from their middle depression as seen in Fig. 5. This bridge plate is riveted to the cheek pieces at its corners and is made permanent therewith, and of course is perforated for the passage of shaft D.

Now, in order that the best possible results may be obtained from the construction above described, I equip the sheave upon each side with a light washer or plate G, occupying the depression in the sides of the sheave and in general matching the plate F, and then cover this plate over with a sheet of raw hide H riveted thereto and occupying the space between the two plates F and G. Both sides of the sheave are finished alike in these particulars. The raw hide bears against the smooth inner surface of the plate F and is not only exceedingly enduring and serviceable in so far as wear is concerned, but also prevents contact between it and plate G which is exceedingly desirable. The raw hide has just enough lubricating quality to avoid wear by friction and is exceedingly enduring in this relation.

Heretofore in blocks of this general character it has been the practice to use wood in making up the wearing surfaces at the sides of the block, but wood is objectionable on account of its constant tendency to shrink, warp or expand according as it may be exposed and its wear by friction. I have here constructed a block which is equally serviceable at all times and temperatures, and in this respect has a material advantage over the mixed wood and iron blocks. Now, in the use of blocks of this kind it is desirable that there should be means to hold the rope H' and to prevent the sheave from turning back beyond a short distance when the operator lets go to take a fresh hold higher up. To this end I provide the sheave with the brake or lock shoe J. This shoe is adapted to come between the straps B and the cheek pieces, as clearly seen in cross section in Fig. 2, and has a longitudinal groove on its under side corresponding to the size of the rope, and is curved to a curvature corresponding to that of the sheave and rope thereon so as to produce a locking surface continuous with the entire length of the said shoe from end to end thereof. The said shoe is further formed with a head shaped projection —10— forming a stop and a cam surface —11— on its back; that is, the shoe increases gradually in depth from the head —10— and its under bearing surface to the heel thereof where the rope or cord —12— is attached. A tubular roller —14— is fixed on a cross spindle —15— extending through the straps and cheek pieces and having sufficient strength to withstand the upward pressure which may be incurred by the said shoe when it is moved forward and locked.

In operation, assuming that the weight is on the down end —16— of the rope, and that the operator is working on the opposite end —18— of the rope, when the operator has pulled down on the end —18— as far as he can pull he wants to let go to take a hold higher up. He then gradually releases his pull on the rope, and when this occurs the weight on the end —16— pulls the rope and sheave that way, and the shoe J, which is resting upon said rope, is carried therewith around to the left and engages its cam back under the roller —14—, and produces a frictional contact between the shoe and the rope which will lock it and prevent the rope and sheave from turning farther. The degree of movement is shown in dotted lines Fig. 1, and amounts to only a couple of inches on the periphery of the sheave. The rope and sheave are thus locked and held from turning, and the operator having taken a new hold higher up finds no difficulty in releasing the lock and giving another additional lift to the weight on the end —16— of the rope. Then as he releases his grip the locking of the shoe as just described is repeated, and so on each time as he takes hold and lets go of the rope.

In lieu of raw hide between the metal plates F and G some other equivalent material having good wearing quality and adapted to work against a metal surface may be used.

Having thus described my invention, what I claim is—

1. A tackle or hoist block, substantially as described, having a carrying strap fixed on the inner side of each cheek piece and said straps constructed with a ball socket in their upper ends, and means connecting said straps at the sides of their socket portion, substantially as set forth.

2. A tackle block having cheek pieces with recesses on their inner sides, straps in said recesses, a flat bridge plate across each strap opposite the sheave and fixed to the cheek piece and having a flat outer wearing surface, a flat wearing plate opposite said bridge plate, and a sheave and shaft or spindle, substantially as set forth.

3. In a tackle or hoisting block, the shell and the straps therein, the metallic bridge plates fixed to said shell over said straps and a covering or sheet of lubricating material over each of said plates, in combination with the sheave and the face plates on the sides thereof, substantially as set forth.

4. The block described having a roller transversely over the sheave, in combination with a curved wedge shaped lock for the sheave bearing against said roller on its back and provided with a projection to limit its movement in one direction, and means to withdraw the said lock from locking position, substantially as set forth.

Witness my hand to the foregoing specification.

HENRY V. HARTZ.

Witnesses:
H. T. FISHER,
GEORGIA SCHAEFFER.